United States Patent Office 3,080,154
Patented Mar. 5, 1963

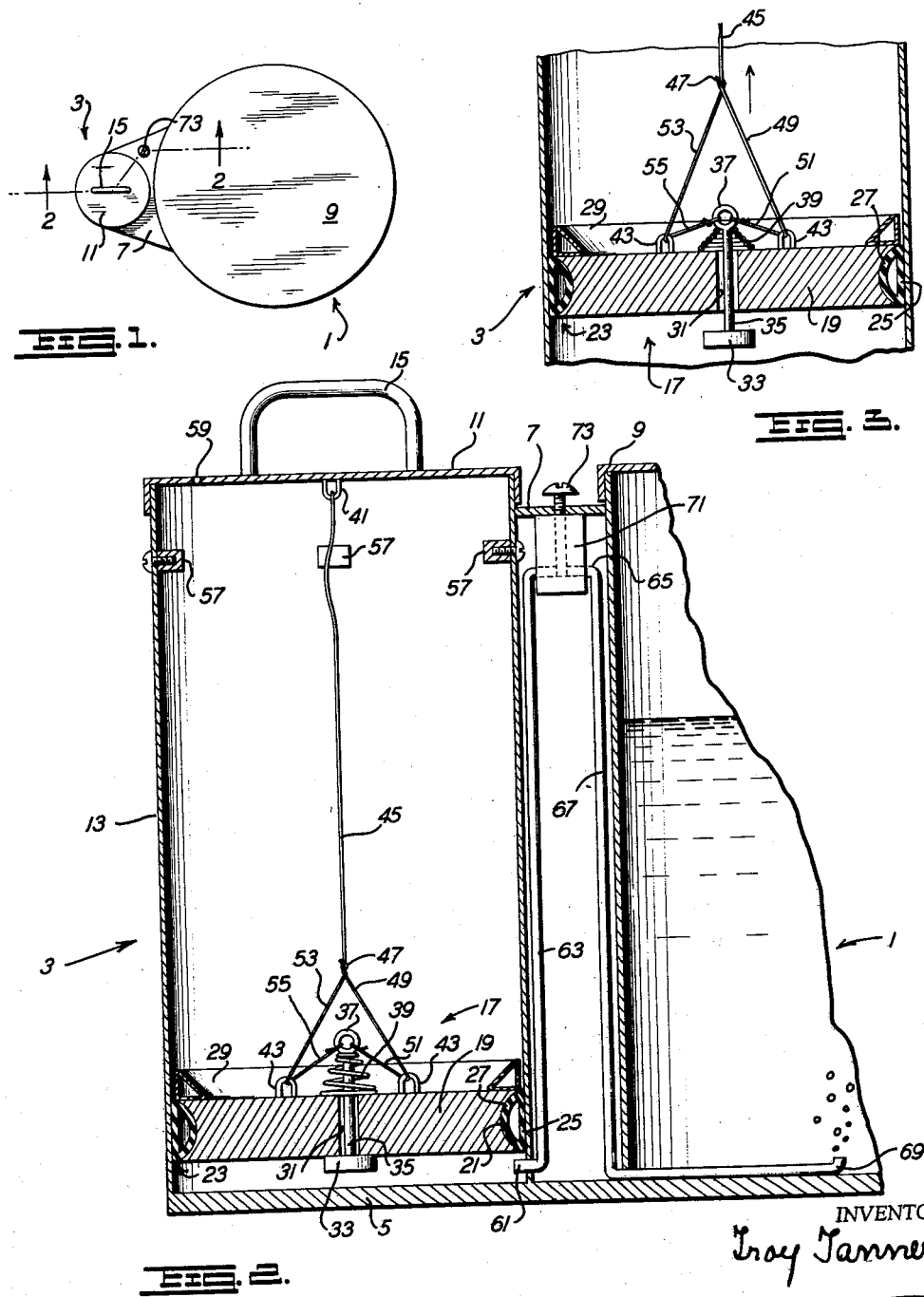

3,080,154
AERATION APPARATUS
Troy Braxton Tanner, 607 Mobile St., Mobile, Ala.
Filed Apr. 20, 1960, Ser. No. 23,517
1 Claim. (Cl. 261—30)

This invention relates broadly to the art of apparatus for aerating fluids, for instance, water, and in its more specific aspects it relates to apparatus for aerating water in a container, such as a bait bucket, so that the bait in the water will be kept alive and maintained in good condition; and the nature and objects of the invention will be readily reconized and understood by those skilled in the art to which it relates in the light of the following explanation and detailed description of the accompanying drawings illustrating what I at present believe to be the preferred embodiment or mechanical expressions of my invention from among various other forms, arrangements, combinations and constructions, of which the invention is capable within the spirit and scope thereof.

It has long been a problem for fishermen to keep their bait which lives in water alive in a bucket or the like container which is filled with water. When a small body of water in a bucket having live bait therein is kept for any period of time, the water becomes de-aerated and the live bait dies and therefore becomes useless for its intended purpose.

Many mechanisms and arrangements have been devised for aerating the water in bait buckets and while some of them do accomplish their purpose, they are impractical in actual use, expensive to produce, complex in their mechanisms and difficult to operate and may be cumbersome and of little or no practical use with a portable bait bucket.

I have overcome the problems which are inherent in prior aerating bait buckets by evolving an inexpensive and compact arrangement involving a simple air producing or pumping mechanism which is easily operated and is fully and completely portable.

Many prior mechanism provide a pump requiring a manual pumping operation, i.e., a manual reciprocation of the piston of the pump. It will be obvious that while such apparatus may cause aeration of water, they require considerable manual effort and also consume the time of the user of the apparatus.

The apparatus which I have devise eliminates the necessity for this tiring and time-consuming up and down manual pumping operation. All that is necessary in my device to produce a stream of air in the water in the bait bucket is the lifting of a member from the pump housing and a replacement thereof whereupon the pumping operation is automatic to produce a slow, steady stream of air through the body of water in the bait bucket. With this simple manual operating the air will be forced through the water for a substantial period of time, keeping the water fully aerated.

One of the many significant advantages in my design of aerating apparatus resides in its simplicity for it has few working parts and thus will require little or no maintenance and is economical to manufacture.

A further advantage of my invention lies in the ease with which it may be operated for it may be operated by a child or one completely without mechanical skill or knowledge.

The aerating apparatus of this invention comprises generally a unitary combination consisting of a bait bucket and a pump combined therewith so that the latter is in communication with the former for flow of air into the bottom of the bait bucket for upward flow through the contained liquid. One of the advantages of the construction which I have devised is that the unitary structure consisting of the bait bucket and the pump may be molded in one piece in one mold from a variety of plastics, fibrous materials or the like. It will be appreciated that due to this substantial manufacturing economies may be achieved.

My invention also contemplates a unique valving mechanism for the pump, one which is inexpensive to produce and assemble and is sure and efficient in operation.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:
FIG. 1 is a top plan view of my apparatus.
FIG. 2 is a view taken on line 2—2 of FIG.1.
FIG. 3 is a fragmentary view illustrating the piston of the pump in its upward stroke with the piston valve opened.

In the accompanying drawings I have used the numeral 1 to designate the water containing bait bucket in its entirety and the numeral 3 to designate the pump in its entirety. The apparatus may include a base 5 which may provide the bottom for the bait bucket and the pump, and the pump and bait bucket may be molded with the base as an integral structure, and are formed or molded of any suitable material which is air and waterproof. Adjacent their tops the pump and bait bucket may be supported or connected by means of a web 7. I provide a top 9 for the bait bucket 1 which may be vented for the escape of air from the bucket and I provide a cover 11 for the pump housing or cylinder 13, and I provide a handle 15 for the cover 11. As will be explained, the cover 11 functions as an operating means for the pump. It will now be appreciated that my aerating apparatus involves two major elements, a pump and a bait bucket adapted to contain water to be aerated, and it will further be appreciated that these elements are preferably integrally formed to provide a compact, easily handled and portable unitary assembly.

Within the pump cylinder 13 I provide a piston designated generally by the numeral 17, the piston being operable within the cylinder to pump air therefrom, and into the bottom of the bait bucket 1 for full aeration of the body of liquid contained therein, as will be explained hereinafter.

The piston 17 comprises a disc-like body member 19 of less diameter than the internal diameter of the cylinder 13 in which the piston is adapted to move in the pumping operation. The piston 19 may be made of metal, such as lead, or of any other suitable material lending to the piston sufficient weight to cause it to travel downwardly in the cylinder to force the air therefrom and into the bait bucket. It is of course within my contemplation to form the body member from a suitable lightweight material and to add weight supplying means thereto so that it will function as desired.

The body member 19 of the piston 17 is formed with a peripheral groove 21 in which is seated a rubber or the like sealing ring 23, which may comprise a closed annulus having a flat side 25 adapted to slidably engage the inner surface of cylinder 13, and a curved side 27 which seats within the groove 21. I may fix a guide member 29 on the piston, the guide member upstands from the upper surface of the piston and is in the form of an annulus and is of a diameter to space it slightly from the inner surface of the cylinder 13. Thus, as the piston reciprocates within the cylinder, the ring 23 will act as a seal serving to prevent air from passing the periphery of the piston and the guide member 29 will keep the piston in proper position and not tilted with respect to the cylinder.

The body member 19 of the piston 17 is provided with a central venting bore 31 which extends fully through the body member. I provide valve means which is automatically operable to open and close the bore or duct of the piston so that during certain phases of the operation the bore will be open and air may pass from one side of the piston to the other and during other phases of the operation the bore will be closed so that no air may pass from one side of the piston to the other.

This valving means includes a disc valve 33 and a valve stem 35 fixed thereto and extending upwardly therefrom and freely through the bore 31. The valve stem is of greater length than the length of the bore and is provided on its upper end with an eye 37 of larger diameter than the diameter of the valve stem. The valve 33 is biased into seated position against the body member closing the bore (see FIG. 2) by means of a compression spring 39 which embraces the valve stem and seats at one end on the body member and at its other end bears against the eye 37.

I have devised a unique arrangement whereby the piston 17 may be retracted from the end of its operative pumping stroke into uppermost position in readiness to gravitate downwardly to force air into the bait bucket, and to simultaneously open valve 33 so that air may pass through the bore 31 from the upper side of the piston to the lower side.

A depending eye 41 is fixed to the underside of cover 11 centrally thereof, and a pair of upstanding eyes 43 are fixed to the upper side of body member 19. One of the eyes 43 is positioned on one side of bore 31 and spaced therefrom and the other eye is positioned on the opposite side of bore 31 and is spaced therefrom. I provide a cord or line 45 which is fixed at one end to the handle eye 41, which as will be understood is in axial alignment with eye 37, and the line 45 is of a length so that its end 47 will be spaced from eye 37. I provide a further cord or line 49 which is fixed at one end to the end 47 of cord 45 and is then threaded through eye 43 from which it extends upwardly as at 51 and is fixed to eye 37 on valve stem 35. I employ a further cord 53 which is fixed at one end to the end 47 of cord 45 and is threaded through the other eye 43 and then extends upwardly as at 55 and is fixed to eye 37 on the end of the valve stem.

With the valve operating means just described the piston 17 may be retracted or moved upwardly in cylinder 13 by grasping handle 15 and lifting cover 11 upwardly. This action will produce an upward axial pull on cord 45 and equal upward tensions or pulls on branch cords 49 and 53 which upward pulls will be translated into equal lateral pulls or tensions on cords 51 and 55 which will create a downward axial force on the valve stem 35, overcoming the force exerted by spring 39 and opening or unseating the valve 33. Thus, I have provided means whereby an axial upward thrust is converted into a downward axial thrust on the valve. Inwardly extending stops 57 may be provided on housing 13 to limit the retracting or upward stroke of the piston.

When it is desired to operate the pump to cause aeration of the water in the bait bucket, the cover 11 is removed and lifted upwardly and through the means described the valve will be opened so that air may flow through the bore as the piston is retracted by the cords, and the pump filled with air. The piston is retracted or drawn upwardly to the stops 57 whereupon the cover is replaced on the cylinder 13 and the tension is released on cord 45 and on branch cords 49, 51, 53 and 55 and these cords become slack so that the downward axial thrust on valve stem 35 is released. With release of the downward axial thrust on the valve stem the spring 39 will function to force the stem upwardly seating the valve 33 and closing the bore 31 against passage of air therethrough.

With the piston in uppermost retracted position within the cylinder the operative pumping stroke will commence. Because of the weight of the piston it will slowly move downwardly in the cylinder and since the valve has been closed by the spring, the piston will force the air ahead of it and into the bait bucket, as will now be explained. The cover may be vented as at 59 to let air into the cylinder behind the piston during its operative stroke.

I provide communicating means between the lower portion of the pump cylinder 13 and the lower portion of the water containing bait bucket 1. Such means may consist of a pipe having an inlet 61 extending into the bottom of cylinder 13 through an opening in the wall thereof. The communicating air conveying pipe includes a vertical leg 63 extending upwardly from the inlet 61 and adjacent to the cylinder 13. At the upper end of leg 63 the communicating pipe is bent to provide a horizontal section 65 from which depends a further vertical leg 67 which extends downwardly adjacent bait bucket 1 to the bottom thereof at which point the pipe is bent and extends through the wall of bait bucket 1 into the interior thereof providing an air discharge 69 which discharges the pumped air into the body of water at the bottom of the water contained in the bait bucket. I may provide a bracket 71 fixed to and depending from web 7, this bracket being connected to horizontal section 65 and forming a support therefor. I may also provide any suitable air control valve 73 operable from above web 7 and extending into pipe section 65 for regulating the flow of air through the communicating pipe or air line and into the bait bucket.

By this construction of communicating pipe comprising an inverted U, I have provided a trap in the air line which prevents water from being sucked from the bait bucket into the pump and I have also made the valve 73 easily accessible for its ready actuation.

Thus, when the piston has been retracted and the cords are slack so that valve 33 is closed, the piston will commence its operative stroke downwardly within pump cylinder 13 and air will be forced through inlet 61 through sections 63, 65 and 67 and into the bottom of the body of water within the bait bucket 1 through air discharge 69. This steady stream of air through discharge 69 will keep the water well aerated and the bait in ready, live condition ready for use.

I claim:

Aerating apparatus including a container adapted to contain a liquid to be aerated, a pump and an air line extending between the lower portion of said pump and the lower portion of said container and in communication with the pump and the interior of the container for conveying air from the former into the latter, trap means in said air line to prevent liquid back flow, and said pump comprising a vertical cylinder having its upper end open to the atmosphere and a piston operable therein, the operative pumping stroke of said piston being gravity actuated, said piston having an air flow bore therethrough, a valve means for closing said bore and a valve stem extending upwardly through and beyond said bore, a spring means connected to the stem and biasing said valve means to an upward normally closed position, a flexible element extending downwardly through said cylinder and two flexible members each being connected at one end to one end of said flexible element, a pair of guide elements fixed on said piston in position thereon below the upper end of the valve stem and radially spaced in opposite directions from said valve stem, one of said flexible members being slidably threaded through one of said guide elements and the other of said flexible members being slidably threaded through the other of said guide elements and the other end of each flexible member being fixed to the upper end of said valve stem, whereby an upward pull on said flexible element will raise the piston and move the valve downward to open position.

(References on following page)

References Cited in the file of this patent

UNITED STATES PATENTS

| | | |
|---|---|---|
| 43,948 | McAvoy | Aug. 23, 1864 |
| 153,512 | Adams et al. | July 28, 1874 |
| 299,765 | Evans | June 3, 1884 |
| 604,717 | Brigham | May 31, 1898 |
| 993,579 | Craven | May 30, 1911 |
| 1,270,760 | Ibach | June 25, 1918 |
| 2,011,186 | VanDijck | Aug. 13, 1935 |
| 2,754,617 | Schwartz | July 17, 1956 |
| 2,785,502 | Sandness | Mar. 19, 1957 |